Figure 1:
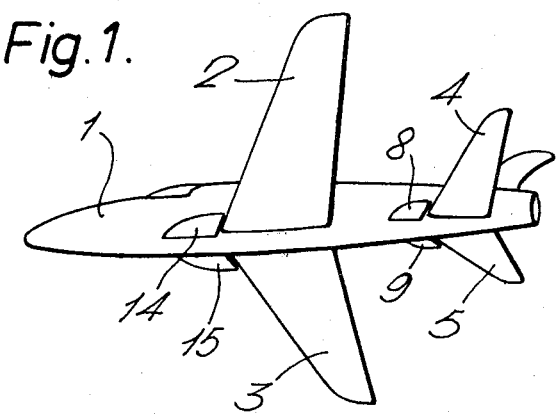

United States Patent [19]

Pegram

[11] 4,381,091
[45] Apr. 26, 1983

[54] CONTROL-EFFECT ENHANCEMENT OF TILTABLE AIRCRAFT STABILIZING MEMBER

[75] Inventor: Barry V. Pegram, Kingston-upon-Thames, England

[73] Assignee: British Aerospace Public Limited Company, Weybridge, England

[21] Appl. No.: 175,413

[22] Filed: Aug. 5, 1980

[30] Foreign Application Priority Data

Aug. 8, 1979 [GB] United Kingdom ............... 7927579

[51] Int. Cl.³ .................... B64C 5/16; B64C 23/00
[52] U.S. Cl. ................................. 244/87; 244/45 R; 244/48; 244/130; 244/198; 244/218
[58] Field of Search ............... 244/34 R, 37, 45 R, 244/46, 48, 87, 89, 91, 130, 198, 213, 215, 216, 218, 219

[56] References Cited

U.S. PATENT DOCUMENTS

| 1,814,115 | 7/1931 | Blain | 244/48 |
| 1,848,037 | 3/1932 | Weick | 244/87 |
| 2,026,482 | 12/1935 | Mattioli | 244/198 |
| 2,081,957 | 6/1937 | Roche | 244/87 |
| 3,270,989 | 9/1966 | Polhamus et al. | 244/46 |
| 3,385,538 | 5/1968 | Hodges | 244/45 R |
| 3,756,529 | 9/1973 | Backlund et al. | 244/48 |
| 3,848,831 | 11/1974 | Geary | 244/45 R |

FOREIGN PATENT DOCUMENTS

| 1481690 | 1/1970 | Fed. Rep. of Germany | 244/45 R |
| 135829 | 2/1921 | United Kingdom | 244/216 |
| 664288 | 1/1952 | United Kingdom | 244/130 |

*Primary Examiner*—Charles E. Frankfort
*Attorney, Agent, or Firm*—Cushman, Darby & Cushman

[57] ABSTRACT

An aircraft having, for example, a tailplane (4, 5) at least part of which is movable with reference to a fuselage (1) to effect control requires the control effect to be enhanced in a certain control position. Accordingly, fixed vanes (8, 9) are provided on the fuselage forward of the tailplane to form a substantially continuous leading edge root extension only when the tailplane is in a given control position.

2 Claims, 6 Drawing Figures

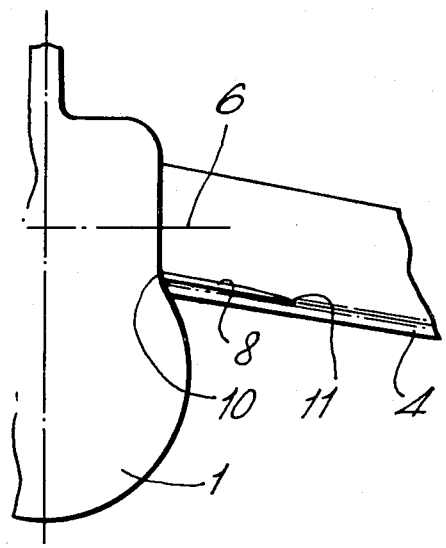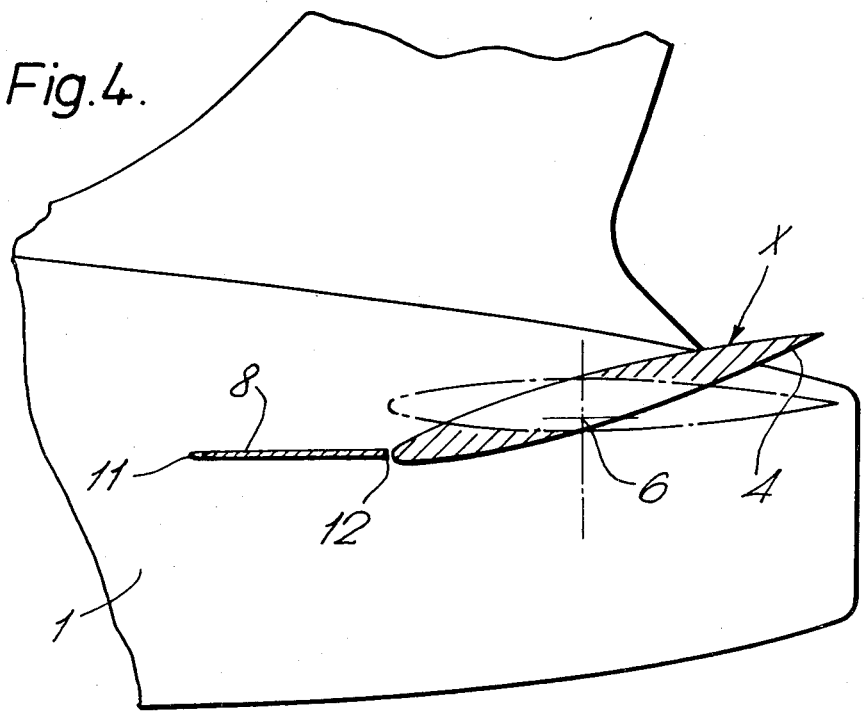

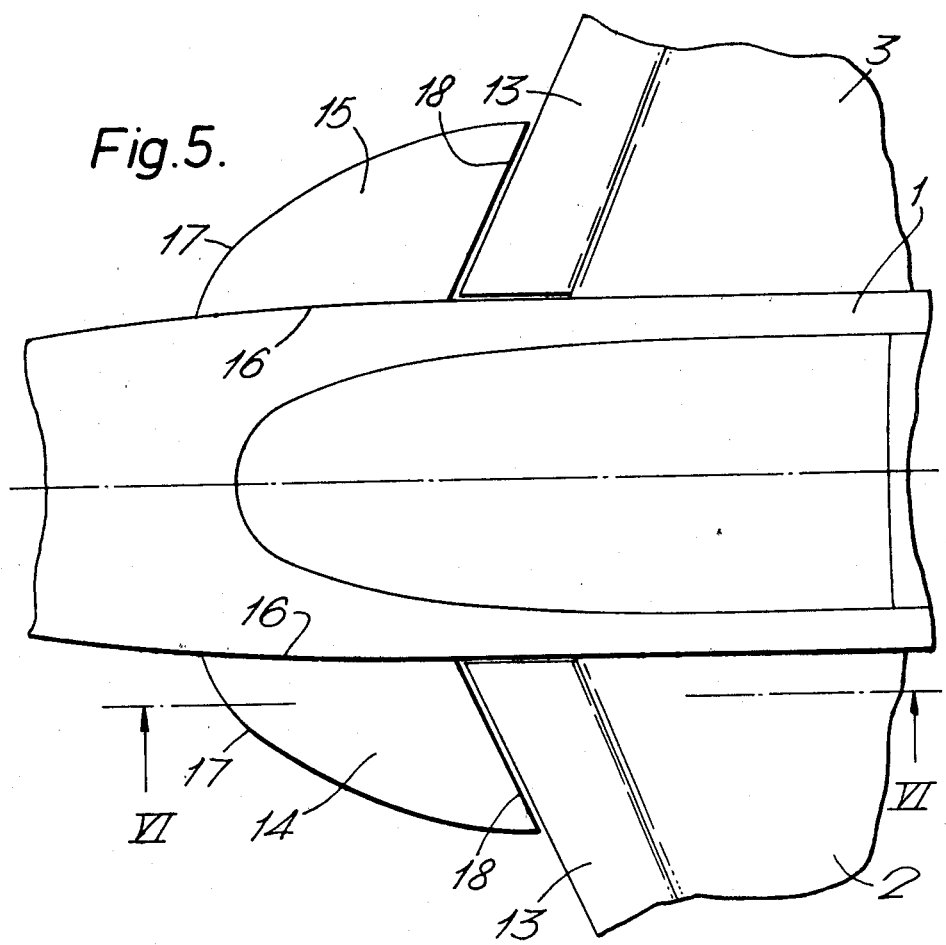
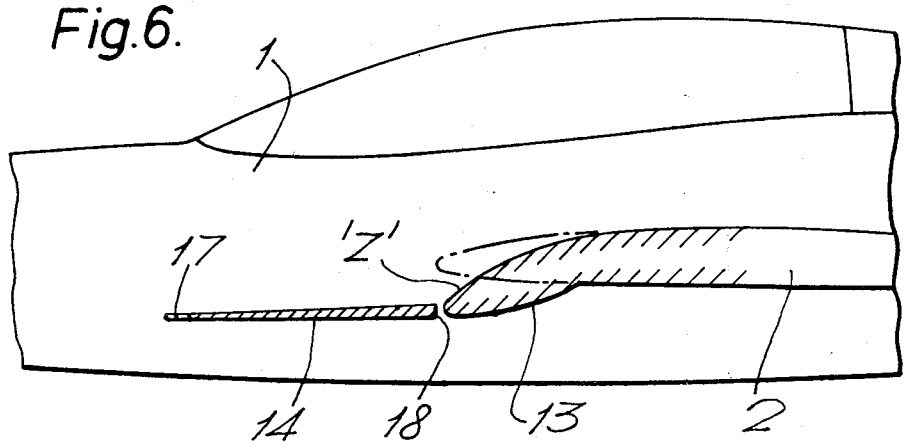

CONTROL-EFFECT ENHANCEMENT OF TILTABLE AIRCRAFT STABILIZING MEMBER

This invention relates to aircraft in which the effectiveness of a lift-producing or stabilizing member (such as a wing or tailplane) having at least a tiltable leading edge requires to be enhanced in certain conditions.

According to the present invention an aircraft includes a fixed member, a lift-producing or stabilizing member, having a leading edge region, extending from the fixed member, at least the leading edge region being tiltable with reference to the fixed member, and a lift or control-enhancing member, having a trailing edge region, extending from the fixed member, the trailing edge region being shaped and positioned to match the leading edge region when that region is in a position of tilt such that the lift-enhancing member then forms a forward extension to the lift-producing member.

Preferably the lift or control-enhancing member is set at or near zero angle of incidence to the local airflow in cruising flight so that it produces only a small drag effect in such flight. The actual incidence setting chosen must however be commensurate with an angle relative to the tilted leading edge which gives a desired lift or control-enhancing effect.

By this arrangement the lift or control-enhancing member has the effect of leading edge root extension on the lift-producing or stabilizing member when such an effect is most required; conversely since it is not attached to the lift-producing member it does not contribute to its weight or area.

Preferably, the lift or control-enhancing member is of low aspect ratio with a sharp leading edge of high average sweep-back; it thus produces a vortex sheet which extends rearwards over the lift-producing member at least when it is substantially continuous with the tilted leading edge.

Figure 2:
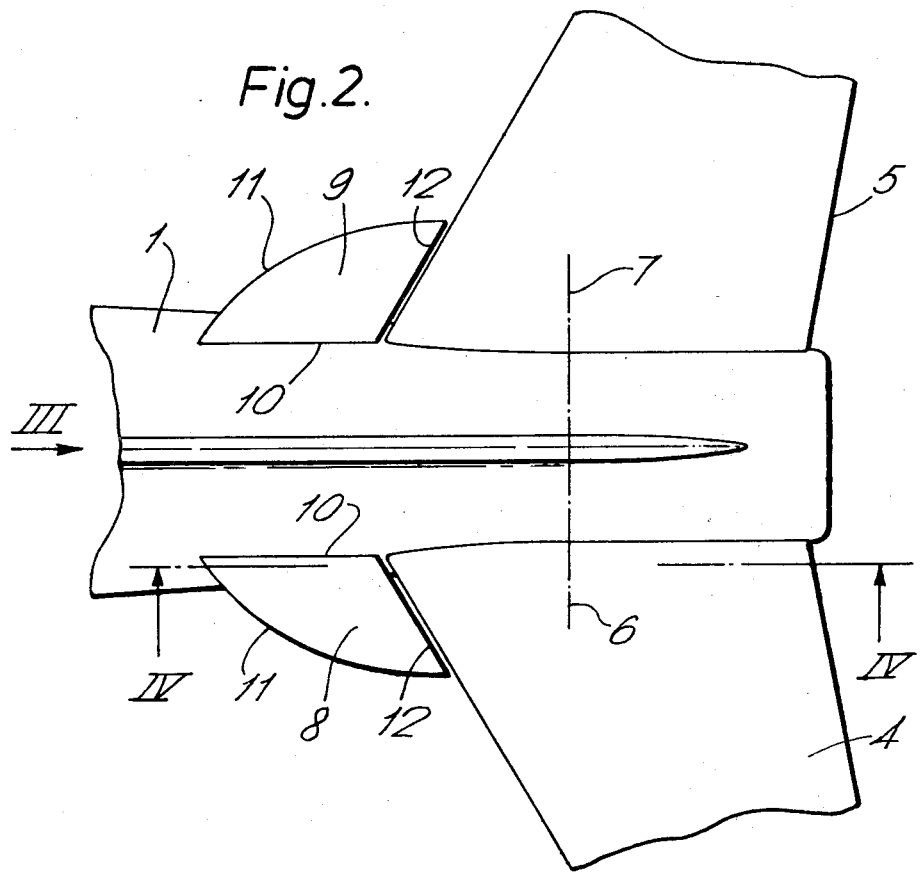

An aircraft according to the invention is described with reference to the accompanying drawings in which:

FIG. 1 is a pictorial view of an aircraft in flight,
FIG. 2 is a plan view of a tailplane to fuselage junction region of the aircraft,
FIG. 3 is a view upon Arrow III of FIG. 2,
FIG. 4 is a sectional view, the section being upon line IV—IV of FIG. 2,
FIG. 5 is a plan view of a wing to fuselage junction region of the, or a further, aircraft, and
FIG. 6 is a sectional view, the section being upon line VI—VI of FIG. 5.

Referring initially to FIGS. 1 to 4, an aircraft has a fuselage 1 to which is attached to two halves 2 and 3 of a wing and the two halves 4 and 5 of a tailplane or stabilizer. The two halves of the tailplane pivot about axes 6 and 7 respectively from a cruise position shown in broken outline in FIG. 4 to various other positions for control in the pitch sense. One such control position is shown in continuous outline at 'X' in FIG. 4. This position is with the leading edge tilted downwardly and the trailing edge raised to give the aircraft a pitch up effect.

To enhance this effect the tailplane halves have lift or control-enhancing members 8 and 9, respectively, mounted upon the fuselage 1 in such a position that they form substantially continuous leading edge root extensions in the 'X' position of the tailplane halves.

The control-enhancing members 8 and 9 are in the form of vanes and each have a wide chord root 10 fixed to the sides of the fuselage, a curved leading edge 11 of high average sweepback, and a trailing edge 12 shaped (with straight sweepback) to closely match the adjacent leading edge regions of the trailplane halves when in the position 'X'. The members 8 and 9 are of much greater sweepback than the tailplane and are of much less span.

The leading edge is sharp as shown in FIG. 3. It is found in this illustrated embodiment that the members 8 and 9 delay tailplane stall just when necessary and that their effect decreases smoothly as the tailplane moves away from its 'X' position of substantial continuity.

Referring now to FIGS. 1, 5 and 6, the aircraft wing, comprising the halves 2 and 3, is of variable geometry having leading edge regions 13 tiltable downwards from a cruise position shown in broken outline in FIG. 6 to various other positions for high lift purposes. One such high lift position is shown in continuous outline at 'Z' in FIG. 6 and as can be seen the leading edge is tilted downwardly.

To enhance the high lift effect the wing halves have lift-enhancing members 14 and 15, mounted upon the fuselage 1 in such a position that they form substantially continuous leading edge root extensions in the 'Z' position of the leading edge regions 13.

The members 14 and 15 are similar to those referenced 8 and 9, being in the form of vanes with a wide chord root 16 fixed to the sides of the fuselage, a curved leading edge 17 of high average sweepback, and a trailing edge 18 shaped to closely match the adjacent leading edge regions of the wing halves when in the position 'Z'. Again, the members 14 and 15 are of much greater sweepback than the wing and are of much less span. The leading edge 17 is sharp.

The pairs of members 8, 9 and 14, 15 may be fitted additionally or alternatively to one another depending upon whether the wing or the tailplane, or both, require lift or control enhancement. Thus, although FIG. 1 shows both pairs of members 8, 9 and 14, 15 fitted for descriptive purposes, only one pair may well be fitted in practice. The members are applicable not only as illustrated to an all moving tailplane or tilting leading edge wing but also to a tilting leading edge tailplane or an all moving wing.

The lift or control-enhancing members 8, 9 and 14, 15 are positioned on the fuselage to be at or near zero incidence with reference to the local airflow in aircraft normal flight so that drag is relatively low in this condition.

In a further embodiment, not shown, the members 8, 9 and 14, 15 are foldable either into or adjacent the fuselage when not required.

If the wing or tailplane of the aircraft are carried by a body other than a fuselage, for example, the tailplane may be carried by a vertical fin, then the lift or control-enhancing members are positioned on that body.

In this specification the term 'lift' refers to all aerodynamically generated forces irrespective of their direction. Some of such forces may be control, rather than lift.

I claim:
1. An aircraft including:
a fixed body;
a tail plane having a leading edge region, mounted on said body for tilting, control-effecting movement about a generally spanwise axis spaced from said leading edge region;
a control-enhancing member, having a trailing edge region, fixedly extending from said body ahead of said tail plane and having a span less than that of said tail plane, said trailing edge region of said control-enhancing member being shaped to match only a root portion of said tail plane leading edge region, said regions being positioned to lie in substantially continuous closely matching relationship only in a predetermined tilted position of said tail plane in which enhancement of the control effect of said tail plane is desired, said member having substantially no effect on either lift or drag in positions of said tail plane, e.g., in cruise flight, other than said pre-determined tilted position in which control enhancement is desired.

2. An aircraft according to claim 1, wherein the control-enhancing member has a leading edge region of higher average sweepback than that of the leading edge region of the tail plane.

* * * * *